United States Patent
Tyagi

(10) Patent No.: US 9,992,412 B1
(45) Date of Patent: Jun. 5, 2018

(54) CAMERA DEVICE WITH VERGED CAMERAS

(71) Applicant: Amazon Technologies, Inc., Seattle, WA (US)

(72) Inventor: Ambrish Tyagi, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 412 days.

(21) Appl. No.: 14/687,451

(22) Filed: Apr. 15, 2015

(51) Int. Cl.
| | |
|---|---|
| H04N 7/00 | (2011.01) |
| H04N 7/18 | (2006.01) |
| H04N 5/232 | (2006.01) |
| G03B 17/56 | (2006.01) |
| H04N 5/247 | (2006.01) |
| H04N 5/225 | (2006.01) |

(52) U.S. Cl.
CPC ....... *H04N 5/23238* (2013.01); *G03B 17/561* (2013.01); *H04N 5/2252* (2013.01); *H04N 5/23296* (2013.01); *H04N 5/247* (2013.01)

(58) Field of Classification Search
None
See application file for complete search history.

(56) References Cited

U.S. PATENT DOCUMENTS

| | | | | |
|---|---|---|---|---|
| 5,657,073 A | * | 8/1997 | Henley | .................. G03B 37/04 348/38 |
| 2004/0032495 A1 | * | 2/2004 | Ortiz | ...................... H04N 5/232 348/157 |
| 2006/0197761 A1 | * | 9/2006 | Suzuki | ..................... G06T 5/006 345/427 |
| 2007/0206945 A1 | * | 9/2007 | DeLorme | ............... G03B 41/00 396/332 |
| 2007/0279494 A1 | * | 12/2007 | Aman | .................... G01S 3/7864 348/169 |
| 2009/0034086 A1 | * | 2/2009 | Montgomery | ......... G03B 35/10 359/629 |
| 2010/0149368 A1 | * | 6/2010 | Yamashita | ......... H04N 5/23238 348/222.1 |
| 2012/0176494 A1 | * | 7/2012 | Kamon | .................... G01C 3/18 348/135 |
| 2013/0002809 A1 | * | 1/2013 | Shimizu | ................ G06T 3/0062 348/38 |
| 2013/0328770 A1 | * | 12/2013 | Parham | ................. G06F 3/0304 345/157 |
| 2014/0071234 A1 | * | 3/2014 | Millett | .................... G01S 17/89 348/43 |
| 2014/0340427 A1 | * | 11/2014 | Baker | ................... G06T 3/0062 345/641 |

(Continued)

Primary Examiner — Talha M Nawaz
(74) Attorney, Agent, or Firm — Eversheds Sutherland (US) LLP

(57) ABSTRACT

A camera device having verged cameras is disclosed. A camera device may include a housing and four cameras disposed in the housing. The housing may define a horizontal plane passing through the center of the housing. Each of the four cameras may be verged at an angle defined by a longitudinal center axis of the camera and the horizontal plane. Each camera may include a vertical field of view verged at the same angle. The camera device may produce a panoramic image (e.g., a panoramic still image or panoramic video) using two or more of the cameras. Systems and processes including the camera device are also disclosed.

17 Claims, 13 Drawing Sheets

(56) References Cited

U.S. PATENT DOCUMENTS

| | | | |
|---|---|---|---|
| 2015/0029304 A1* | 1/2015 | Park | H04N 5/23238 |
| | | | 348/36 |
| 2015/0077513 A1* | 3/2015 | Beers | G02B 27/1066 |
| | | | 348/38 |
| 2016/0044240 A1* | 2/2016 | Beers | G06T 3/005 |
| | | | 348/36 |

* cited by examiner

CAMERA DEVICE WITH VERGED CAMERAS

BACKGROUND

Photography is creative art form that leverages artistic concepts with the technical capabilities of camera equipment to create electronic or print images. Many electronic devices include cameras that enable user to capture still images and video of their environment. The position and orientation of such devices may enable photographers to capture images in unique and interesting ways.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1A:
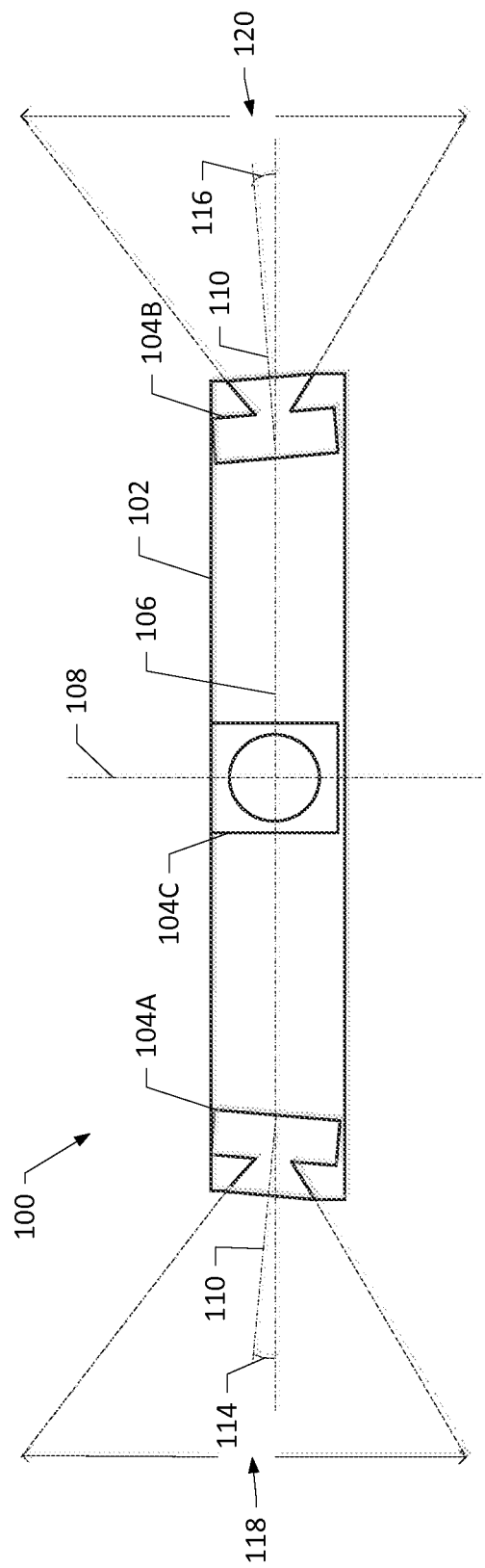
FIGS. 1A and 1B are schematic side views of a camera device with verged cameras in accordance with an embodiment of the disclosure.

This disclosure relates to, among other things, a camera device having two or more verged cameras. In an example embodiment of the disclosure, a camera device may include a housing and four cameras disposed in the housing. The housing may define a horizontal plane passing through the center of the housing. Each of the four cameras may be verged at an angle defined by a longitudinal center axis of each camera and the horizontal plane. In some embodiments, each camera is verged at the same angle. In other embodiments, each camera may be verged at a different angle. Each camera may include a vertical field of view verged at the same angle. The camera device may produce a panoramic image (e.g., a panoramic still image or panoramic video) using two or more of the cameras.

In some embodiments, the camera housing may include connectors disposed at one end and receptacles or other mounting components disposed at the opposite end. In some embodiments, the connectors may receive a battery charger and the receptacles or other mounting components may receive a mounting apparatus (e.g., a self-stick). The connectors and receptacles may enforce orientations on the camera device and cameras. For example, in a first orientation, the camera device may be connected to a battery charger such that a first end is resting on the battery charger or a surface and is the "bottom" of the device. In a second orientation, the camera device may be rotated 180 degrees around the horizontal plane and the camera device may engage a mounting apparatus via the mounting components, such that a second end of the device may be the "bottom" of the device. In some embodiments, the housing may be generally toroid-shaped and may have a hollow central cylinder including the connectors and mounting components described above.

In another example embodiment of the disclosure, a camera device may include a housing and four cameras disposed in the housing and moveably verged between different angles. The housing may define a horizontal plane passing through the center of the housing. Each of the four cameras may be moveably verged to multiple angles defined by a longitudinal center axis of each camera and the horizontal plane. The camera device may include a movement mechanism such as one or more motors or one or more microelectromechanical systems (MEMS). The cameras of the camera device may be independently moved to different angles or collectively moved to the same angle. In some embodiments, the housing may be generally toroid-shaped and may have a hollow central cylinder including the connectors and mounting components described above.

In some embodiments, image-recognition, such as face-recognition, may be performed on images (e.g., still images or video) captured by the camera device to identify a region (e.g., a face) in the image. In some embodiments, one or more frames captured by cameras of the camera device may be compared to previously captured frames to determine whether the region is moving toward or away from the device. If the region is moving toward or away from the device, one or more of the cameras may be moveably verged to a different angle to maintain the region in the vertical field of view (or in a designated area of the vertical field of view) of one or more of the cameras.

The above-described embodiments and other embodiments of the disclosure will be described in detail hereinafter through reference to the accompanying drawings. In addition, it should be appreciated that the example technical effects described above are merely illustrative and not exhaustive.

Figure 1B:
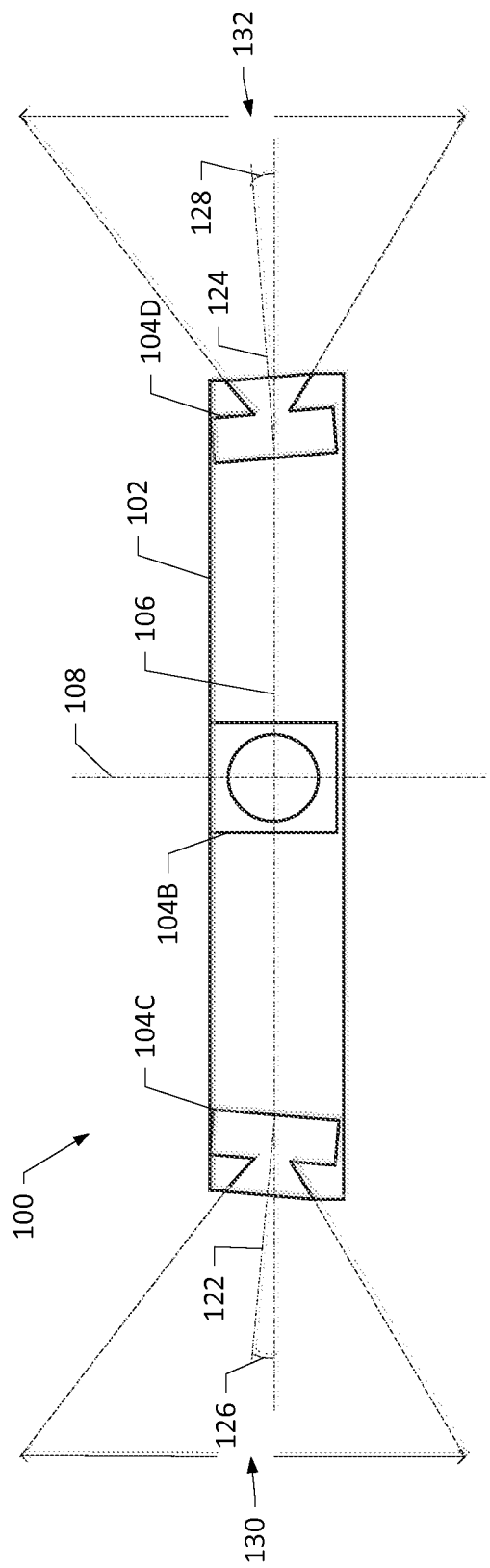

FIGS. 1A and 1B are schematic diagrams of a side view of a camera device 100 having multiple verged cameras 104 in accordance with an embodiment of the present disclosure. As shown in FIGS. 1A and 1B, the camera device 100 includes a housing 102 and cameras 104A, 104B, 104C, and 104D. In some embodiments, the camera device 100 may include two, three, five, six, or more cameras.

FIG. 1A depicts a first side view of the camera device 100 illustrating the cameras 104A, 104B, and 104C. In some embodiments, the cameras 104A and 104B may be disposed on opposite sides of the housing 102. In some embodiments, the camera 104D may be disposed opposite the third camera 104C. In other embodiments, the cameras 104 may be distributed around the housing 102 in other suitable arrangements (i.e., each camera 104 may not necessarily be directly opposite another camera).

The cameras 104 may be used to capture images via the camera device 100. The cameras 104 may vary in resolution, field of view, and/or shutter speed. The cameras 104 may include, but are not limited to, charge coupled device (CCD) cameras, complementary metal oxide semiconductor (CMOS) image sensor cameras, infrared cameras, or optical lens cameras. In some embodiments, the cameras 104 may be "high-definition" (HD) cameras and may capture images (e.g., still images or video) at any suitable resolutions, up to and including 4K resolution or higher. In some embodiments, the cameras 104 may capture video at various frame rates, including 24 frames-per-second (fps), 25 fps, 30 fps, 50 fps, and 60 fps.

Figure 3:
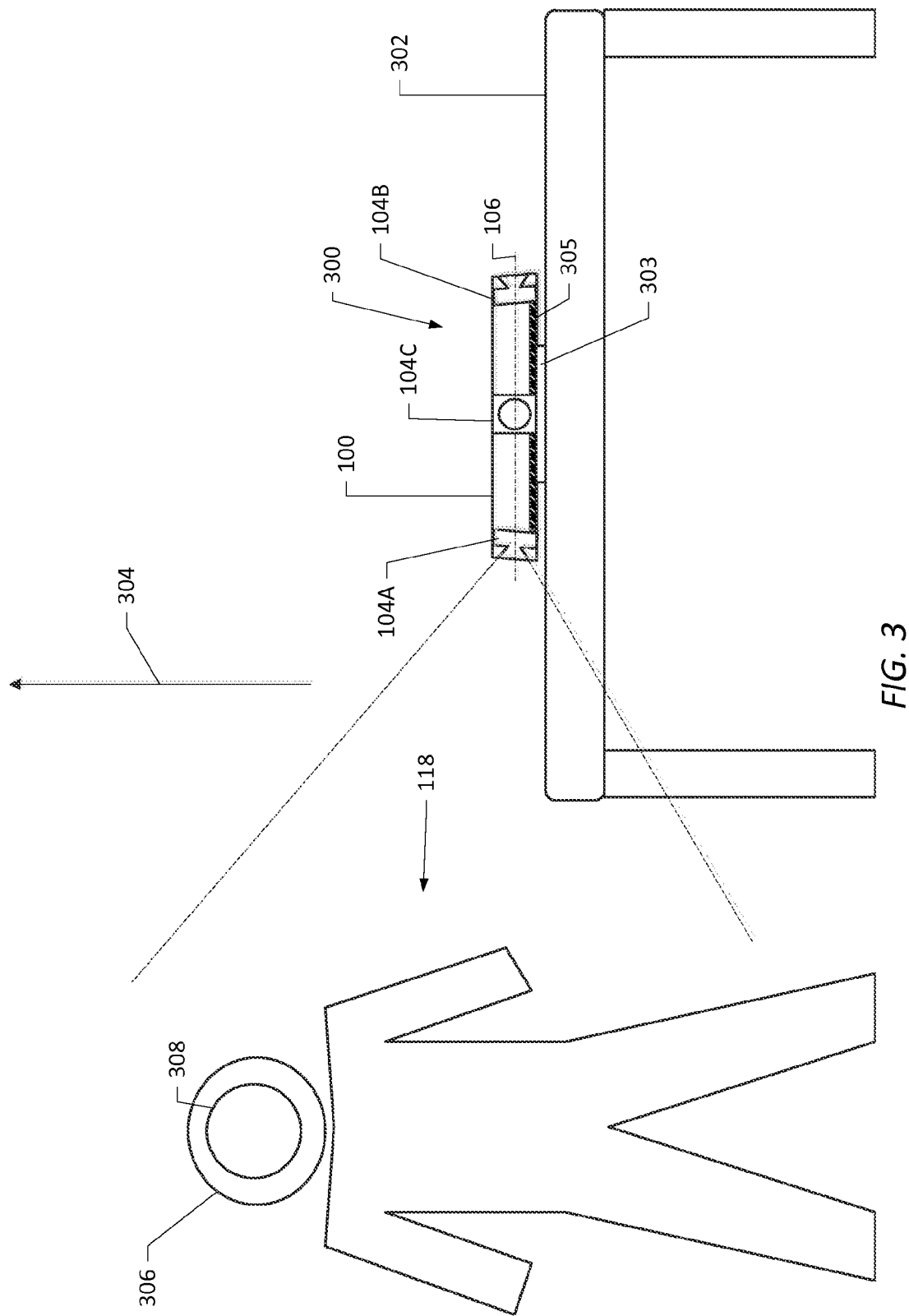
FIG. 3 is a schematic view of a first orientation of the camera device of FIG. 1 in accordance with an embodiment of the disclosure.

As shown in FIGS. 1A and 1B the housing 102 may, in some embodiments, be generally frustoconical shaped. The housing 102 may define a horizontal plane 106 passing through a center 108 of the housing 102. In other embodiments, the housing 102 may be other shapes, such as cuboid shaped, cube shaped, cylindrical, hexagonal, or other shapes including irregular shapes. In some embodiments, as illustrated in FIG. 3 and as described below, the housing 102 may be a frustoconical-shaped toroid that may define a hollow cylinder in the center. In some embodiments, the housing 102 may provide water-resistance, water-proofing, shock-proofing, or other similar capabilities for the camera device 100.

As shown in FIGS. 1A and 1B, each camera 104 may be verged (i.e., inclined) at a nonzero angle with respect to the horizontal plane 106. The camera 104A may define a longitudinal center axis 110 extending through the center of the camera 104A, and the camera 104B may define a longitudinal center axis 112 extending through the center of the camera 104A. The camera 104A may be verged at an angle 114 defined by the center axis 110 and the horizontal plane 106. Similarly, the camera 104B may be verged at an angle 116 defined by the center axis 112 and the horizontal plane 106. In some embodiments, the angles 114 and 116 may be equal. In the orientation depicted in FIG. 1A, the angles 114 and 116 may appear as greater than zero with respect to the horizontal plane 106. In other embodiments or orientations, the angles 114 and 116 may appear as less than zero with respect to the horizontal plane 106.

As mentioned above, each of the cameras 104 may have a field of view (FOV) (also referred to as "angle of view") dependent on the lens and image sensor of each camera 104. For example, as shown in FIG. 1A, the camera 104A may have an FOV 118. In the orientation of the device 100 depicted in FIGS. 1A and 1B, the verging of the camera 104A at the angle 114 also verges the FOV 118, such that the FOV 118 is not symmetrical with respect to the horizontal plane 106. Similarly, as also depicted in FIG. 1A, the camera 104B has an FOV 120, and the verging of the camera 104B also verges the FOV 120, such that the FOV 120 is not symmetrical with respect to the horizontal plane 106. Thus, the cameras 104A and 104B capture an increased view above the horizontal plane 106 as opposed to a camera without verging (i.e., a camera having no angle between its longitudinal center axis and the horizontal plane 106).

FIG. 1B depicts another side view of the camera device 100 illustrating the cameras 104C, 104B, and 104D. In some embodiments, the cameras 104C and 104D may be disposed on opposite sides of the housing 102. In other embodiments, the cameras 104 may be distributed around the housing 102 in other suitable arrangements (i.e., each camera 104 may not necessarily be directly opposite another camera).

As shown in FIG. 1B, the cameras 104C and 104D may also be verged (i.e., inclined) at a nonzero angle with respect to the horizontal plane 106. The camera 104C may define a longitudinal center axis 122 extending through the center of the camera 104C, and the camera 104D may define a longitudinal center axis 124 extending through the center of the camera 104D. The camera 104C may be verged at an angle 126 defined by the center axis 122 and the horizontal plane 106. Similarly, the camera 104D may be verged at an angle 128 defined by the center axis 124 and the horizontal plane 106. In some embodiments, the angles 114, 116, 126 and 128 may be equal. In the orientation depicted in FIG. 1B, the angles 126 and 128 may appear as greater than zero with respect to the horizontal plane 106. In other embodiments or orientations, the angles 126 and 128 may appear as less than zero with respect to the horizontal plane 106. In some embodiments, the angles 114, 116, 126, and 128 may be at least 10° (or −10°), at least 20° (or −20°), at least 30° (or −30°), or at least 40° (or −40°).

In some embodiments, the angles 114, 116, 126, and 128 may be selected to ensure a specific region (e.g., a region that includes an object of interest) in an image is within the vertical FOV of the cameras when camera device 100 is in a specific location, mounted on a mounting apparatus, resting on a structure (e.g., a table), or other arrangements.

The FOVs of the cameras 104C and 104D are also depicted in FIG. 1B. For example, as shown in FIG. 1B, the camera 104C may have an FOV 130. In the orientation of the device 100 depicted in FIGS. 1A and 1B, the verging of the camera 104A at the angle 126 also verges the FOV 130. Similarly, as also depicted in FIG. 1B, the camera 104D has an FOV 132, and the verging of the camera 104B also verges the FOV 132. Thus, similar to the cameras 104A and 104B, the verged cameras 104C and 104D may capture an increased view above the horizontal plane 106 as opposed to cameras without verging (i.e., cameras having no angle between their center axes and the horizontal plane 106).

Figure 2:
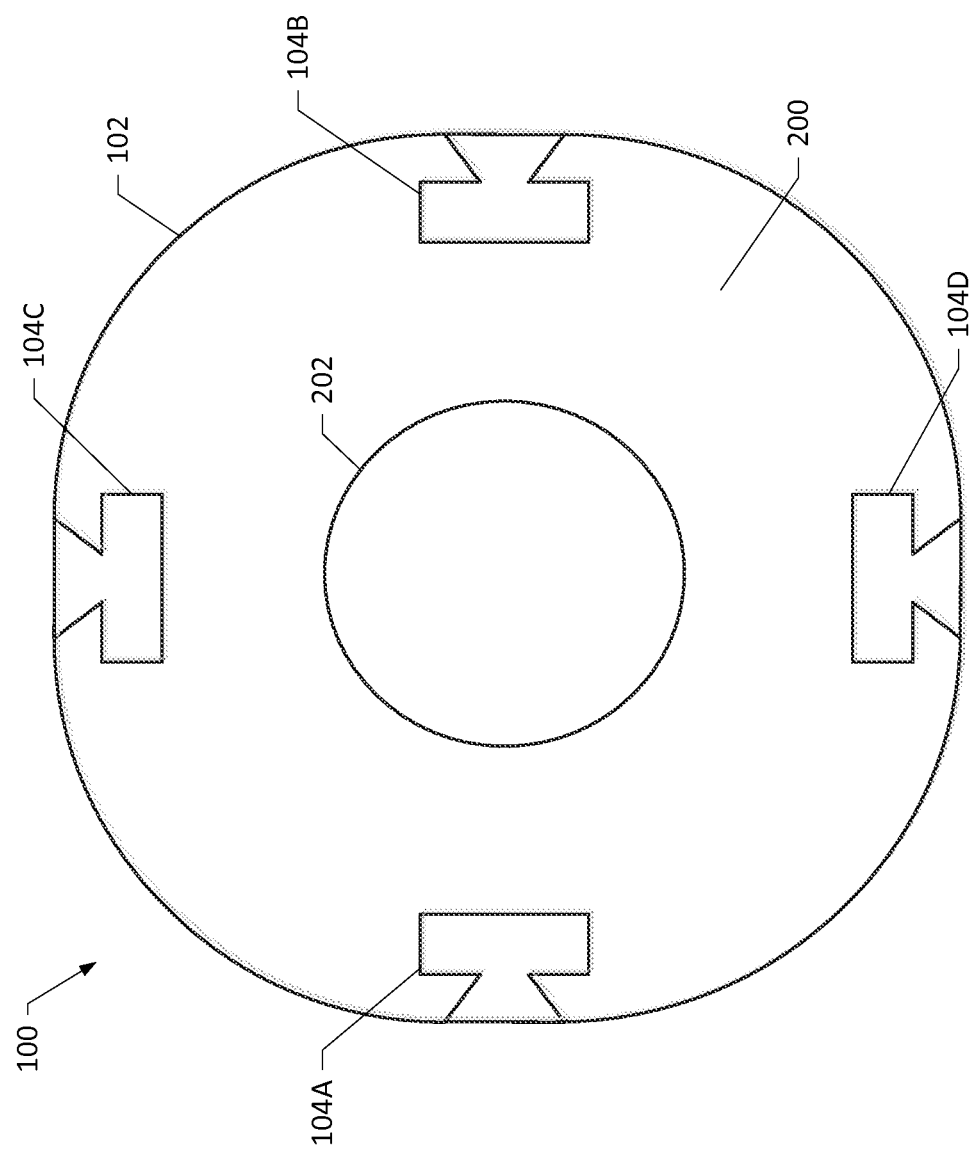
FIG. 2 is a schematic top view of the camera device of FIG. 1 in accordance with an embodiment of the disclosure.

FIG. 2 is a schematic diagram of a top view of the camera device 100 in accordance with an embodiment of the disclosure. As shown in FIG. 2, each camera 104 may be disposed around the housing 102. In some embodiments, the housing 102 may be toroid shaped and may have an annular portion 200 defining a hollow cylinder 202. In some embodiments, the cameras 104A, 104B, 104C, and 104D may be disposed equidistant from each other around the circumference of the annular portion 200. As described further below, the hollow cylinder 202 may accommodate, in combination with components disposed within, connection of a battery charger (such as a battery charger provided by a dock) at one end of the hollow cylinder 202 and a mounting apparatus at an opposite end of the hollow cylinder 202.

FIG. 3 is a schematic diagram illustrating a first orientation 300 of the camera device 100 in accordance with an embodiment of the disclosure. As shown in FIG. 3, the camera device 100 may be positioned in the center of a table 302, such that the camera is resting on the table 302. In some embodiments, the camera device 100 may be positioned on a dock 303 (e.g., a charging dock) resting on the table 302.

In the position shown in FIG. 3, the cameras 104 are positioned to capture images around the table 300. As described above, the cameras 104 are verged with respect to the housing 102 such that the FOV of each camera 104 is also verged; thus, as shown in FIG. 3, the FOV of each camera 104 is verged "upward" with respect to the table 300 in the direction illustrated by arrow 304. As a result, less of the vertical FOV of each of the cameras 104 is obscured by the table 302 and more of the real-world scene above the table 302 may be captured by the cameras 104. In the first orientation 300 depicted in FIG. 3, for example, the shaded region 305 of the housing 303 may appear as the "bottom" of the camera device 100.

In some embodiments, the verged cameras 104 and respective FOVs may provide for a capture of relevant regions, and features of regions (e.g., regions that include an object of interest), when the camera device 100 is positioned on a structure (e.g., table 302) and in the first orientation 300. For example, as shown FIG. 3, a person 306 having facial features 308 may be partially or fully within the FOV 118 of the camera 104A. As the person 306 moves around the table 302, the other cameras 104 of the device 100 also verged at the same angle as the camera 104A, may continue to capture the facial features 308 of the person 306. In some embodiments, image-recognition may be performed on an image captured by the cameras 104 to recognize a region (e.g., an object of interest in the region) in the image. In some embodiments, for example, facial recognition may be performed on the facial features 308 of the person 306. Thus, in the first orientation 300 of the device 100, the verged cameras 104 may enable sufficient capture of the facial features 308 as the person 306 moves around the table 300. In contrast, cameras having a zero angle between the longitudinal center axis and the horizontal plane of the device 100 may cutoff or clip the facial features 308 of the person 306. In other embodiments, other regions disposed or moving around the table 302 may be sufficiently within the verged FOVs of the cameras 104 to enable sufficient capture of the region for image-recognition or other processing.

Figure 4:
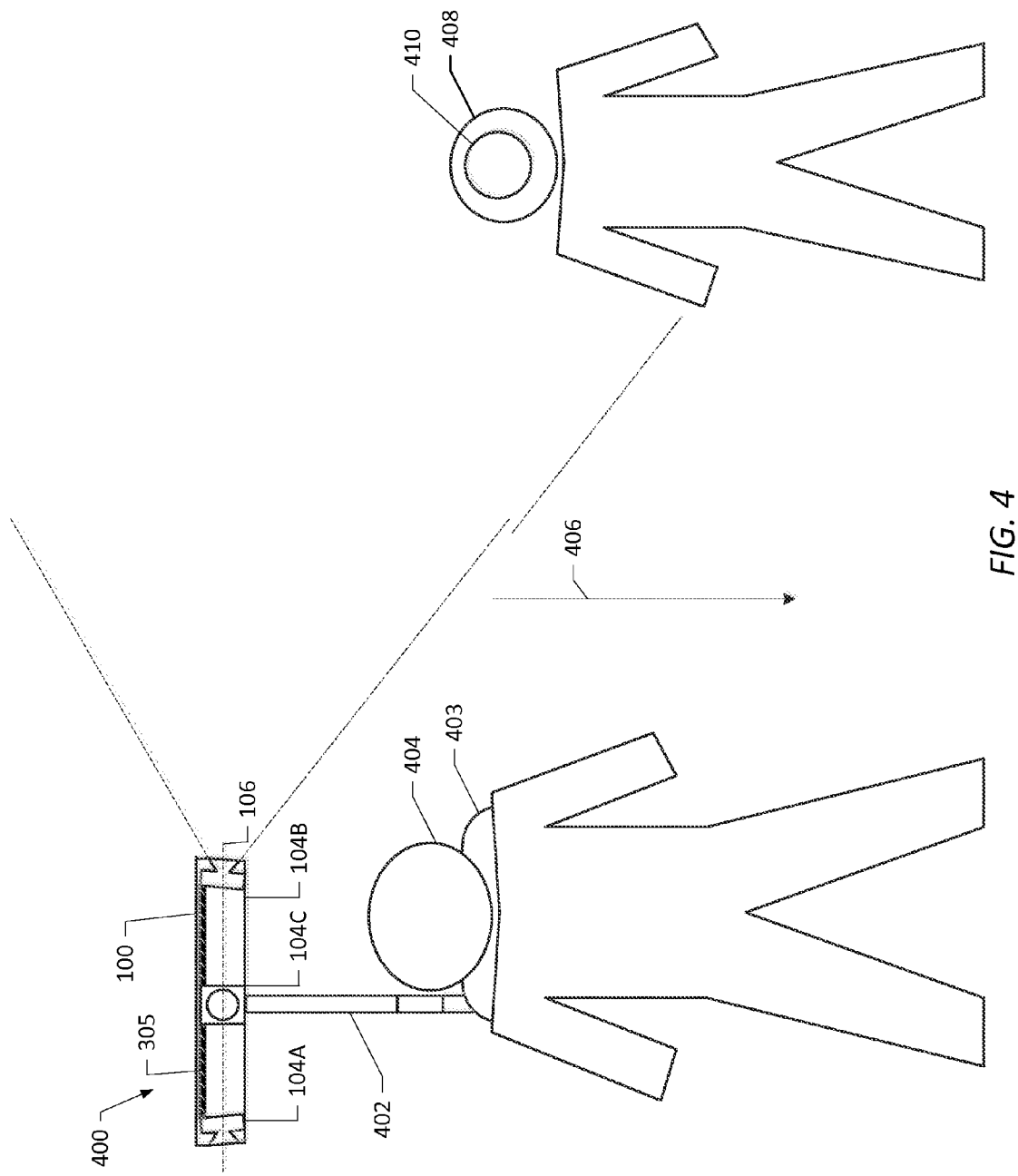
FIG. 4 is a schematic view of a second orientation of the camera device of FIG. 1 in accordance with an embodiment of the disclosure.

FIG. 4 is a schematic diagram illustrating a second orientation 400 of the camera device 100 in accordance with an embodiment of the disclosure. As shown in FIG. 4, in the second orientation 400, the camera device 100 may be coupled to a mounting apparatus 402. In some embodiments, the second orientation 400 may be achieved by turning the camera device 100 around the horizontal plane 106. In some embodiments, the mounting apparatus 402 may be attached to or carried by a person 404 (e.g., the owner or operator of the camera device 100). For example, the mounting apparatus 402 may be coupled to a backpack 403 worn by the person 404. In some embodiments, for example, the mounting apparatus 402 may be a monopod such as a "selfie stick", a tripod, or other apparatus. In some embodiments, the mounting apparatus 402 may include other apparatus configured to be coupled to stationary objects, such as furniture, buildings, or other objects.

As described above, the cameras 104 of the camera device 100 are verged with respect to the housing 102 such that the FOV of each camera 104 is also verged; thus, in the orientation depicted in FIG. 4, the FOV of each camera 104 is verged "downward" in the direction illustrated by arrow 406. Consequently, more of the FOV of each of the cameras 104 is directed to capture more of the real-world scene below the camera device 100. In the second orientation 400 depicted in FIG. 4, for example, the shaded region 305 of the housing 303 may appear as the "top" of the camera device 100.

In some embodiments, the verged cameras 104 and respective FOVs may provide for a capture of relevant regions and features when the camera device 100 is positioned on the mounting apparatus 402 and in the second orientation 400. For example, as shown FIG. 4, a second person 408 having facial features 408 may be partially or fully within the FOV 118 of the camera 104A. As the second person 408 moves around the camera device 100 (e.g., as result of movement by the first person 404, the second person 408, or both), the other cameras 104 of the device 100 that are verged (e.g., at the same angle as camera 104A) may continue to capture relevant regions and features, e.g., the facial features 410 of the person 408, as opposed to a camera without verging. As noted above, in some embodiments, image-recognition may be performed on an image captured by the cameras 104, such as, for example, facial recognition performed on the facial features 410 of the person 408. Thus, in the second orientation 400 of the device 100, the verged cameras 104 may enable sufficient capture of the facial features 410 as the camera device 100 and the second person 410 move relative to one another. In other embodiments, other regions disposed or moving around the camera device 100 may be sufficiently within the verged FOVs of the cameras 104 to enable sufficient capture of the region for image-recognition or other processing.

Figure 5:
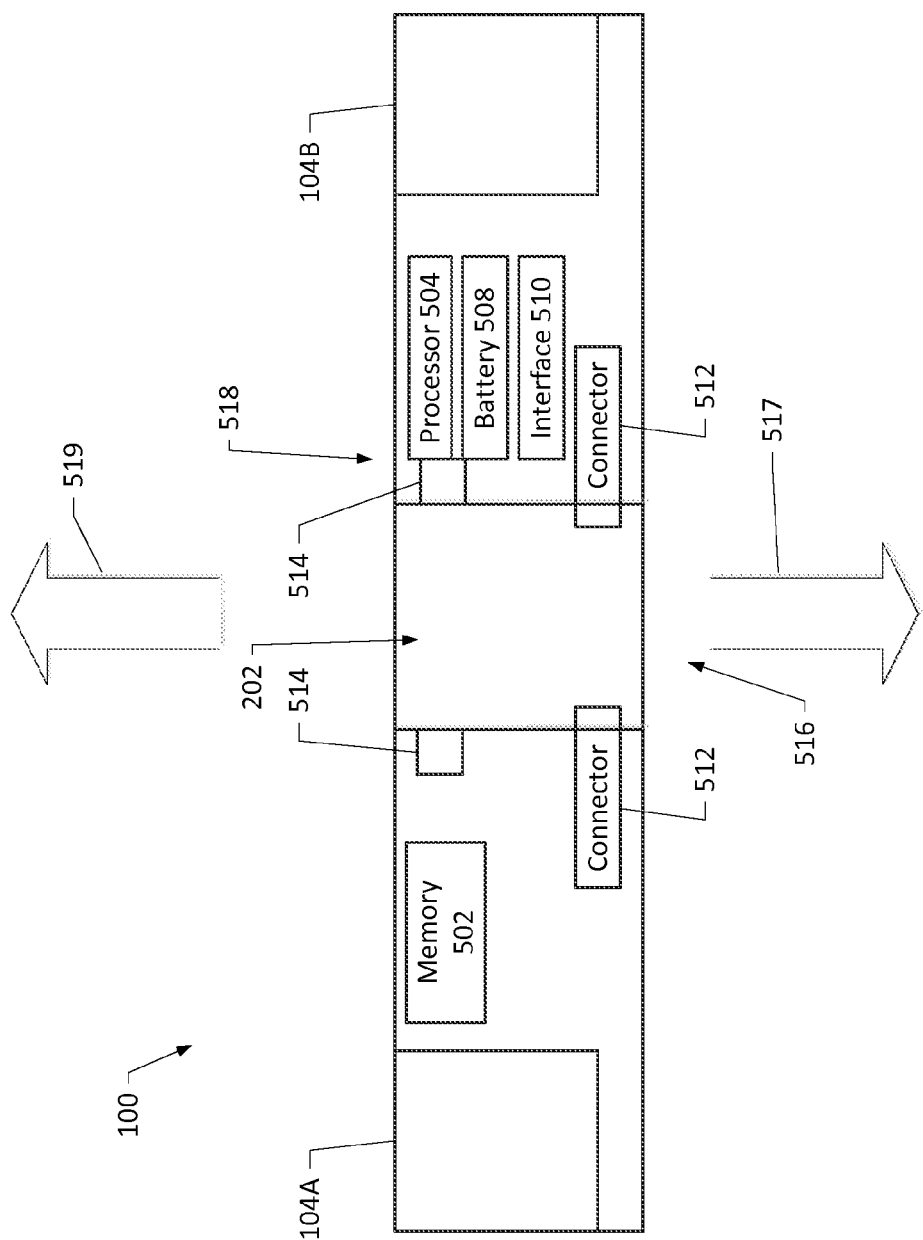
FIG. 5 is a block diagram of the camera device of FIG. 1 in accordance with an embodiment of the disclosure.

FIG. 5 depicts a block diagram of the camera device 100 in accordance with an embodiment of the disclosure. As shown in FIG. 5, in some embodiments the camera device 100 may include a memory 500, a processor 504, a battery 508, and an interface 510. In some embodiments, the camera device 100 may include one or more connectors 512 and one or more receptacles 514. FIG. 5 also depicts the cameras 104A and 104B.

The processor 504 may include one or more processors that may each include one or more cores. The processor 504 may be configured to access and execute (at least in part) computer-readable instructions stored in the memory 502. The processor 504 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The camera device 100 may also include a chipset (not shown) for controlling communications between the processor 504 and one or more of the other components of the camera device 100. The processor 504 may also include one or more application-specific integrated circuits (ASICs) or application-specific standard products (ASSPs) for handling specific data processing functions or tasks.

The interface 510 may include one or more interfaces and may include one or more communication interfaces or network interface devices to provide for the transfer of data between the camera device 100 and another device directly such as in a peer-to-peer fashion, via an electrical network (not shown), or both. The communication interfaces may provide access to, for example, personal area networks ("PANs"), wired local area networks ("LANs"), wireless local area networks ("WLANs"), wireless wide area networks ("WWANs"), and so forth. The communication interfaces may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP) or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), Short Message Service (SMS), or any other suitable communication protocols.

The memory 502 (which may include one or more tangible non-transitory computer readable storage medium) may include volatile memory, such as random access memory (RAM), and non-volatile memory, such as ROM, flash memory, a hard drive, any other suitable optical, magnetic, or solid-state storage medium, or a combination thereof. The memory 502 may be accessible by the processor 504 and other components of the camera device 100. The memory 502 may store a variety of information and may be used for a variety of purposes and may store executable computer code. The executable computer code may include program instructions executable by a processor (e.g., the processor 502) to implement one or more embodiments of described herein. The memory 502 may store an operating system that includes a plurality of computer-executable instructions that may be implemented by the processor 502 to perform a variety of tasks to operate the cameras 104 and other components of the camera device 100. The memory 502 may provide for storage of, for example, camera buffers, images, and video.

In some embodiments, the camera device 100 may include other components, such as a display (e.g., an liquid crystal display (LCD) screen or an organic light-emitting diode (OLED) screen, a card slot configured to receive memory cards such as microSD cards, speakers, microphones, and the so on. In some embodiments, for example, the camera device 1000 may include microphones to capture audio in addition to images. Audio captured by the microphones may be stored as audio data and associated with image data.

The connectors 512 may provide for the connection of additional devices to the camera device 100. In some embodiments, the connectors 512 may include any number of input and output ports, including headphone and headset jacks, universal serial bus (USB) ports, Firewire (IEEE-1394) ports, Thunderbolt ports, and AC and DC power connectors. Further, the camera device 100 may use the input and output ports to connect to and send or receive data with any other device, such as other portable computers, personal computers, printers, etc.

The connectors 512 may be configured to connect to a battery charger, such as a battery charger to charge the battery 508. The battery 508 may include any suitable battery types such as nickel-cadmium, lithium-ion or other suitable battery types and provide power sufficient for operation of the camera device and associated various components. In some embodiments, the connectors 512 may be or include pins, sockets, plugs, blades, or other suitable types of connectors. In some embodiments, a portion of or all of the connector 512 may extend in the hollow cylinder 202 of the housing 102 of the device 100. In some embodiments, the connectors 512 may disposed near a first end 516 of the cylinder 202 (e.g., the connectors are closer the first end 516 than they are to the opposite end of the cylinder 202). For example, as described above and as indicated by arrow 517, the camera device 100 may be coupled to a dock such as by inserted a portion of the dock into the cylinder 212 to connect to the connectors 512.

The receptacles 514 may be configured to receive a mounting apparatus (e.g., the mounting apparatus 402) extended into the hollow cylinder 202. In some embodiments, the receptacles 514 may extend into the hollow cylinder 202. In some embodiments, the receptacles 514 may engage components (e.g., protrusions) in a mounting apparatus. In other embodiments, the mounting components may be protrusions in a wall of the hollow cylinder 202, recesses in a wall of the hollow cylinder, threads in a wall of the hollow cylinder 202, pins extending from the wall of the hollow cylinder 202, a track in the wall of the hollow cylinder 202, or other suitable mounting components.

In some embodiments, the connectors 512 and mounting components 514 may work in combination to enforce orientations of the camera device 100. For example, in a first orientation, the camera device 100 may be connected to a battery charger such that the first end 516 is resting on the battery charger or a surface and may be described as the "bottom" of the device 100. For example, as described above and as indicated by arrow 517, the camera device 100 may be coupled to a dock such as by inserted a portion of the dock into the cylinder 212 to connect to the connectors 512.

In a second orientation, the camera device 100 may be rotated 180 degrees around the horizontal plane 106 and the mounting components 514 may be engaged with a mounting apparatus, such that the second end of the device may be described as the "bottom of the device 100. For example, as described above and as indicated by arrow 519, the camera device 100 may be coupled to a mounting apparatus such as by inserting a portion of the portion apparatus into the cylinder 202 to engage to the receptacles 514.

Figure 6A:
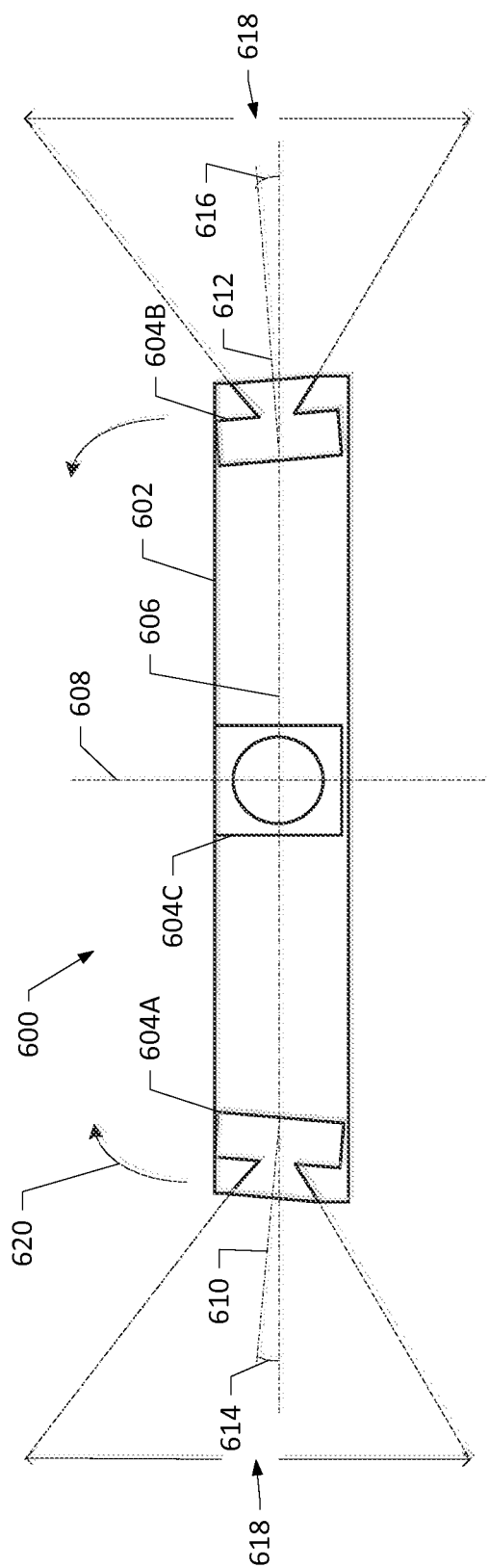
FIGS. 6A and 6B are schematic side views of a camera device with moveable verged cameras in accordance with an embodiment of the disclosure.
Figure 6B:
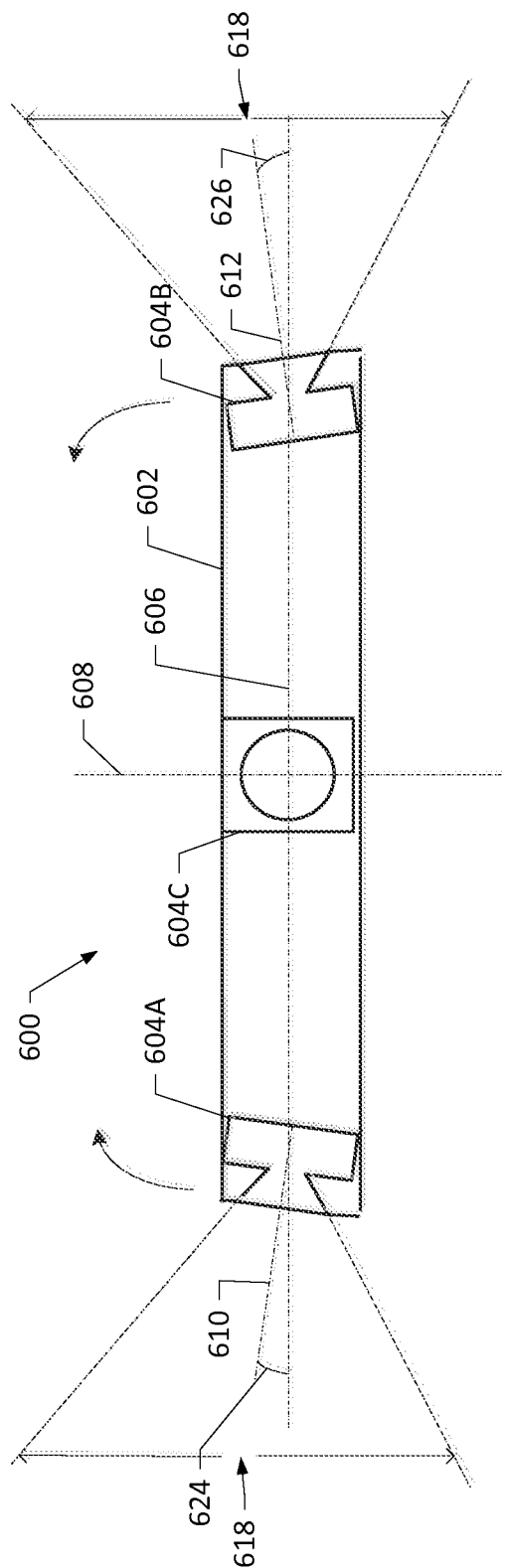

FIGS. 6A and 6B are schematic diagrams of a side view of a camera device 600 in accordance with another embodiment of the present disclosure. As shown in FIG. 6, the camera device 100 includes a housing 602, and cameras 604A, 604B, 604C, and 604 D arranged in a manner similar to the embodiment described above and depicted in FIGS. 1A and 1B. The cameras 604A and 604B may be disposed on opposite sides of the housing 602. The housing 600 may define a horizontal plane 606 passing through a center 608 of the housing 602.

The cameras 604 may be used to capture images via the camera device 600. The cameras 604 may vary in resolution, field of view, and/or shutter speed. The cameras 604 may include, but are not limited to, charge coupled device (CCD) cameras, complementary metal oxide semiconductor (CMOS) image sensor cameras, infrared cameras, or optical lens cameras. In some embodiments, the cameras 104 may be "high-definition" (HD) cameras and may capture images (e.g., still images or video) at any suitable resolutions, up to and including 4K resolution or higher. In some embodiments, the cameras 604 may capture video at various frame rates, including 24 frames-per-second (fps), 25 fps, 30 fps, 50 fps, and 60 fps.

The cameras 604 may be moveable (e.g., rotatable) to a nonzero angle with respect to the horizontal plane 606. Thus, each camera 604 may be moveably verged (e.g., inclined) between a zero angle and a non-zero angle with respect to the horizontal plane 106. The camera 604A may define a longitudinal center axis 612 extending through the center of the camera 604A and the camera 604B may define a longitudinal center axis 612 extending through the center of the camera 604B. FIG. 6A depicts the first camera 604A moveably verged to a first angle 614 defined by the center axis 610 and the horizontal plane 606. Similarly, the camera 604B may be moveably verged to an angle 616 defined by the center axis 612 and the horizontal plane 606. In some embodiments, the angles 614 and 616 may be equal. It should be appreciated that other cameras of the camera device 100, such as cameras 104C and 104D, may also be moveably verged to angles defined by their center axes and the horizontal plane 606. In some embodiments, these angles may also equal the angles 614 and 616. The cameras 604 may be moveably verged to angles (e.g., angles 614 and 616) that may appear as greater than zero with respect to the horizontal plane 606. In other embodiments or orientations, the cameras 604 may be moveably verged to angles (e.g., angles 614 and 616) that may appear as less than zero with respect to the horizontal plane 606. In some embodiments, the angles 614 and 616 and angles associated with the cameras 604C and 604D may each be at least 10° (or −10°), at least 20° (or −20°), at least 30° (or −30°), or at least 40° (or −40°).

Each of the cameras 604 may have a field of view (FOV) dependent on the lens and image sensor of each camera 604. For example, as shown in FIG. 6A, the camera 604A may have an FOV 618. In the orientation of the device 600 depicted in FIG. 6, the verged camera 604A at the angle 614 may also verge the FOV 618. As also depicted in FIG. 6A, the camera 604B has an FOV 620, and the verging of the camera 604B also verges the FOV 620. Thus, the cameras 604A and 604B capture an increased view above the horizontal plane 606 as opposed to a camera without verging.

The cameras 604A and 604B may be moveably verged (e.g., inclined) with respect to the horizontal plane 606. As noted above, the cameras 604 may be moveably verged to a second non-zero angle. For example, the camera 604A may be moveably verged in the direction indicated by arrow 620 to increase the angle between the center axis 610 and the horizontal plane 606. Similarly, the camera 604B may be moveably verged in the direction indicated by arrow 622 to increase the angle between the center axis 612 and the horizontal plane 606. FIG. 6B depicts the side view of the camera device 600 illustrating movement of the cameras 604A and 604B to a greater angle between the center axes of the cameras and the horizontal plane 606 in accordance with an embodiment of the disclosure.

As shown in FIG. 6B, the camera 604A may be moveably verged to a third angle 624 defined by the center axis 610 and the horizontal plane 606, such that the third angle 624 is greater than the first angle 614 depicted in FIG. 6A. Similarly, the camera 604B may be moveably verged to a fourth angle 626 defined by the center axis 612 and the horizontal plane 606, such that the fourth angle 626 is greater than the second angle 616. In some embodiments, the third angle 624 and the fourth angle 626 may be equal. In some embodiments, each of the cameras 604A, 604B, 604C, and 604D may be independently moved such that each verge angle of each camera is different. In other embodiments, each of the cameras 604A, 604B, 604C, and 604D may move together such that each verge angle is equal to each other.

In some embodiments, the cameras 604 may be moveable verged to maintain a region within the vertical FOV of the cameras or within a designated area of the vertical FOV. In some embodiments, the control of the moveable verging may be selected to facilitate face detection and tracking. For example, if the camera device 600 is resting on a table (such as depicted in FIG. 4), as a person approaches the camera device 600 the cameras 604 may be moveably verged to increase the angles and maintain the person's face in a designated area (e.g., the center) of or within the vertical FOV of the cameras 604. If the person subsequently moves away from the camera device 600, the cameras 604 may be moveably verged to increase the angles and maintain the person's face in a designated area (e.g., the center) of or within the vertical FOV of the cameras 604.

In some embodiments, the housing 602 of the camera device 600 may have the same shape and features as the housing 102 described above and illustrated in FIGS. 1-3. For example, the housing 602 may, in some embodiments, be generally frustoconical shaped. In other embodiments, the housing 602 may be other shapes, such as cuboid shaped, cube shaped, cylindrical, hexagonal, or other shapes including irregular shapes. In some embodiments, the housing 602 may be a frustoconical-shaped toroid that may define a hollow cylinder in the center. In some embodiments, the housing 602 may provide water-resistance, water-proofing, shock-proofing, or other similar capabilities for the camera device 600.

Figure 7:
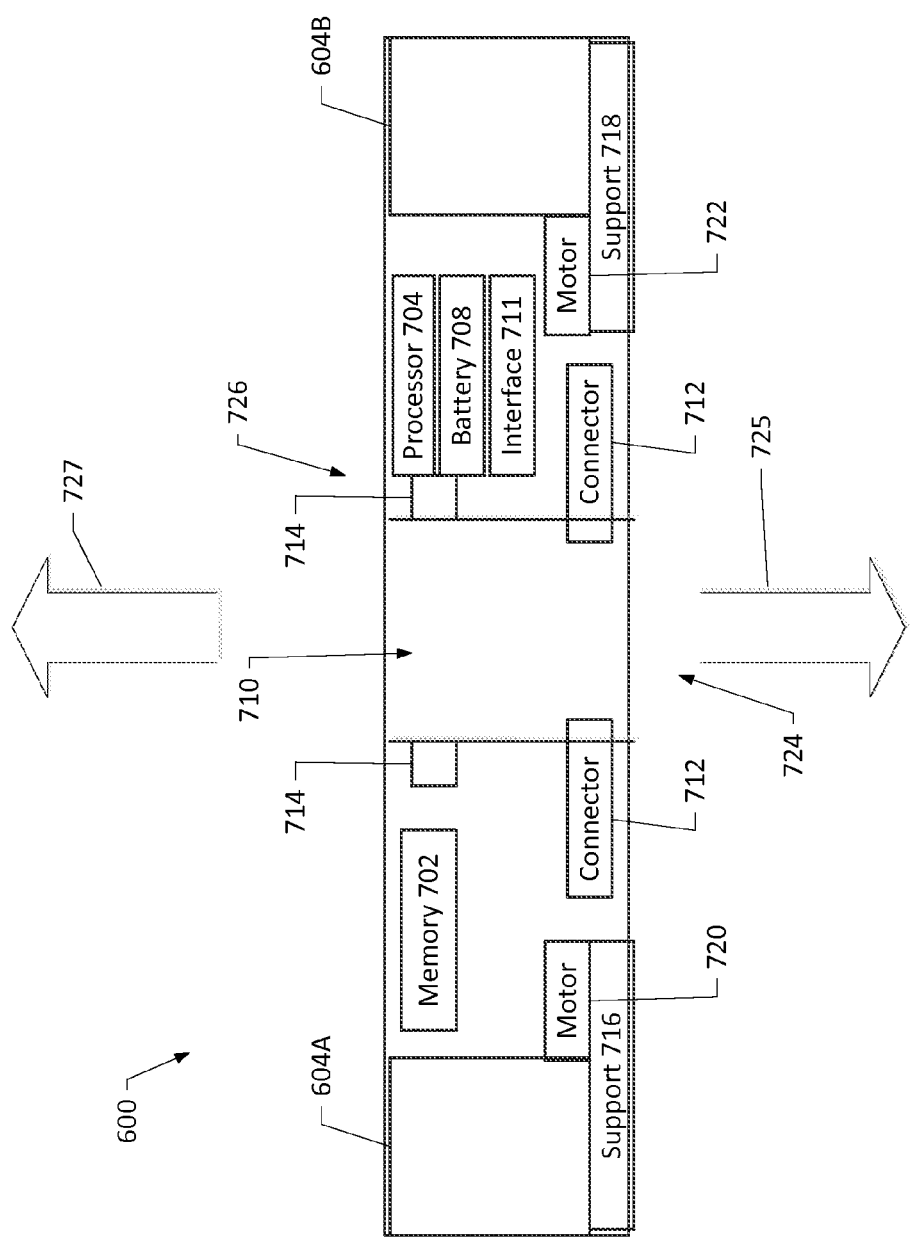
FIG. 7 is a block diagram of the camera device of FIG. 6 in accordance with an embodiment of the disclosure.

FIG. 7 depicts a block diagram of the camera device 600 in accordance with an embodiment of the disclosure. As shown in FIG. 7, in some embodiments the camera device 600 may include a memory 702, a processor 704, storage 706, and a battery 708 and, as shown in FIG. 7, the cameras 604A and 604B. In some embodiments, as noted above, the housing of the camera device 600 may be a toroid defining a hollow cylinder 710 in the center.

Similar to the embodiment discussed above and illustrated in FIG. 5, the processor 704 may include one or more processors that may each include one or more cores. The processor 704 may be configured to access and execute (at least in part) computer-readable instructions stored in the memory 702. The processor 704 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The camera device 600 may also include a chipset (not shown) for controlling communications between the processor 704 and one or more of the other components of the camera device 600. The processor 704 may also include one or more application-specific integrated circuits (ASICs) or application-specific standard products (ASSPs) for handling specific data processing functions or tasks.

The interface 711 my function similarly to the interface 510 described above. For example, the interface 711 may include one or more interfaces and may include one or more communication interfaces or network interface devices to provide for the transfer of data between the camera device 600 and another device directly such as in a peer-to-peer fashion, via an electrical network (not shown), or both. The communication interfaces may provide access to, for example, personal area networks ("PANs"), wired local area networks ("LANs"), wireless local area networks ("WLANs"), wireless wide area networks ("WWANs"), and so forth. The communication interfaces may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP) or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), Short Message Service (SMS), or any other suitable communication protocols.

The memory 702 (which may include one or more tangible non-transitory computer readable storage medium) may include volatile memory, such as random access memory (RAM), and non-volatile memory, such as ROM, flash memory, a hard drive, any other suitable optical, magnetic, or solid-state storage medium, or a combination thereof. The memory 702 may be accessible by the processor 704 and other components of the camera device 600. The memory 702 may store a variety of information and may be used for a variety of purposes and may store executable computer code. The executable computer code may include program instructions executable by a processor (e.g., the processor 702) to implement one or more embodiments of described herein. The memory 702 may store an operating system that includes a plurality of computer-executable instructions that may be implemented by the processor 702 to perform a variety of tasks to operate the cameras 604 and other components of the camera device 600. The memory 702 may provide for storage of, for example, camera buffers, images, and video.

In some embodiments, the camera device 600 may include one or more connectors 712 and one or more mounting components 714. The connectors 712 may be similar to the connectors 512 described above and may provide for the connection of additional devices to the camera device 600. In some embodiments, the connectors 712 may include any number of input and output ports, including headphone and headset jacks, universal serial bus (USB) ports, Firewire (IEEE-1394) ports, Thunderbolt ports, and AC and DC power connectors. Further, the camera device 600 may use the input and output ports to connect to and send or receive data with any other device, such as other portable computers, personal computers, printers, etc.

The connectors 712 may be configured to connect to a battery charger, such as a battery charger to charge the battery 708. In some embodiments, a portion of or all of the connector 712 may extend in a hollow cylinder 710 of the housing 602 of the device 600. In some embodiments, the connectors 712 may disposed near a first end 724 of the cylinder 710 (e.g., the connectors are closer the first end 724 than they are to the opposite end of the cylinder 710).

The mounting components 714 may be configured to receive a mounting apparatus (e.g., the mounting apparatus 402) extended into the hollow cylinder 710. In some embodiments, the mounting components 714 may extend into the hollow cylinder 710. In some embodiments, the mounting components 714 may engage components (e.g., protrusions) in a mounting apparatus. In some embodiments, the mounting components 714 may be receptacles in a wall of the hollow cylinder 710, protrusions in a wall of the hollow cylinder 710, recesses in a wall of the hollow cylinder 710, threads in a wall of the hollow cylinder 710, pins extending from the wall of the hollow cylinder 710, a track in the wall of the hollow cylinder 710, or other suitable mounting components.

As shown in FIG. 7, each camera may be coupled to a moveable support. For example, camera 604A may be coupled to a moveable support 716 and the camera 604B may be coupled to a moveable support 718. The moveable supports 716 and 718 may be moveable via one or more motors. For example, in the embodiment shown in FIG. 7, the moveable support 714 may be moveable via motor 720 and the moveable support may be moveable via a motor 722. The other cameras of the camera device 600 (e.g., cameras 604C and 604D) may each be coupled to a respective moveable support. In some embodiments, each camera of a camera device may be coupled to an independent moveable support. In other embodiments, each camera may be coupled to a single moveable support, such that all cameras are moveably verged together.

In some embodiments, the camera device 600 may include microelectromechanical systems (MEMS) instead of motors. In such embodiments, the camera device 600 with MEMS to facilitate movement of a moveable support and the cameras may use comparatively less power than a device having motors.

In some embodiments, the moveably verged cameras 604 may enable calibration of the cameras at runtime (as opposed to calibration before shipping or packaging of the cameras). For example, in some embodiments, the cameras 604 may be calibrated by verging the cameras with respect to a test object or scene captured by the captures. In such embodiments, for example, calibration modules may be stored on the storage 706 and executed by the processor 704. In some embodiments, the calibration may be dynamically determined in response to additional verging of the cameras. For example, if one or more cameras having an existing calibration are moveably verged to a different angle, another calibration may be determined before images are captured by the cameras.

As discussed above, in some embodiments, the connectors 712 and mounting components 714 may work in combination to select orientations of the camera device 600. For example, in a first orientation, the camera device 500 may be connected to a battery charger such that the first end 724 may be described as the "bottom" of the device 600. For example, as described above and as indicated by arrow 725, the camera device 600 may be coupled to a dock such as by inserted a portion of the dock into the cylinder 710 to connect to the connectors 712.

In a second orientation, the camera device 600 may be rotated 180 degrees around the horizontal plane 606 and the mounting components 614 may be engaged with a mounting apparatus, such that the second end 726 of the device may be described as the "bottom of the device 600. For example, as described above and as indicated by arrow 727, the camera device 100 may be coupled to a mounting apparatus such as by inserting a portion of the apparatus into the cylinder 710 to engage the protrusions 714.

In some embodiments, the camera device 600 may not include components configured to enforce orientations on the device. For example, instead of changing an orientation of the camera device 600 when the device is mounted to a mounting apparatus or disposed on a table or other structure, the cameras 604 of the camera device 600 may be verged to a suitable angle for capturing a region of interest relative to the mounting apparatus or the table or other structure. In such embodiments, the connectors 712 and mounting components 714 may be located in areas of the housing 600 or the housing 600 may be a different shape.

Figure 8:
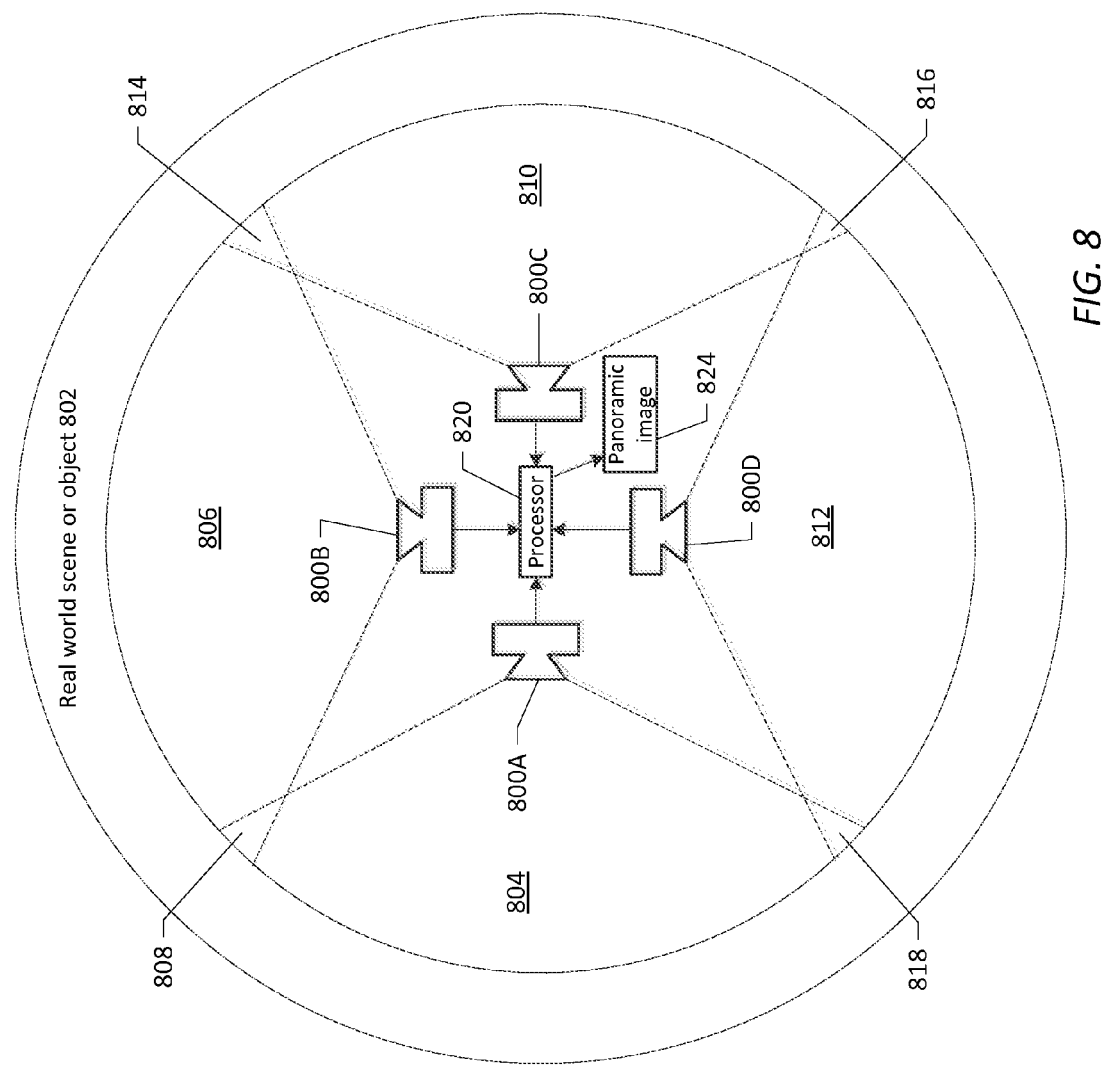
FIG. 8 is a schematic diagram depicting operation of multiple cameras 800 to provide a panoramic image of a real-world scene in accordance with an embodiment of the disclosure.

FIG. 8 is a schematic diagram depicting operation of multiple cameras 800 to provide a panoramic image of a real-world scene 802. A first camera 800A with a first FOV 804 may capture an image of a real-world scene 802. Similarly, a second camera 800B with a second FOV 806 may capture an image of the real-world scene 802. In some instances, the FOVs 804 and 806 may have an overlap area 808. Additionally, the third camera 800C and fourth camera 800D with respective FOVs 810 and 812 may capture an image of a real-world scene 802. In some instances, the FOVs 810 and 812 may have overlap regions 814 and 816.

Each camera 800 may provide captured image data to a processor 820 (e.g., an image processor). In some embodiments, the overlap regions may be determined based on previously performed calibration or an initial calibration that may be subsequently adjusted. In some embodiments, the overlap regions may be determined at the pixel level to accommodate for vertical, horizontal, or other misalignments. In some embodiments, the processor may perform image correction to adjust capture images.

In some embodiments, the arrangement depicted in FIG. 8 may be used to calibrate the cameras of a camera device. For example, the real-world scene 802 may be or include a test pattern or test object that enables easier calibration of the cameras 800. In some embodiments, the processor may combine (referred to as "stich") image data captured from two or more of the cameras 800 to generate a panoramic image 822. In some embodiments, distortion or artifacts between captured images may be removed or minimized by the processor. In some embodiments, for example, image data from all four cameras 800A, 800B, 800C, and 800D may be combined to produce a 360 degree panoramic image. In other embodiments, a camera device having two cameras may produce a stereo image of the real world scene 802. For example, two cameras having a single overlap area may provide captured image data to a processor (e.g., an image processor) to product a stereo image.

Figure 9:
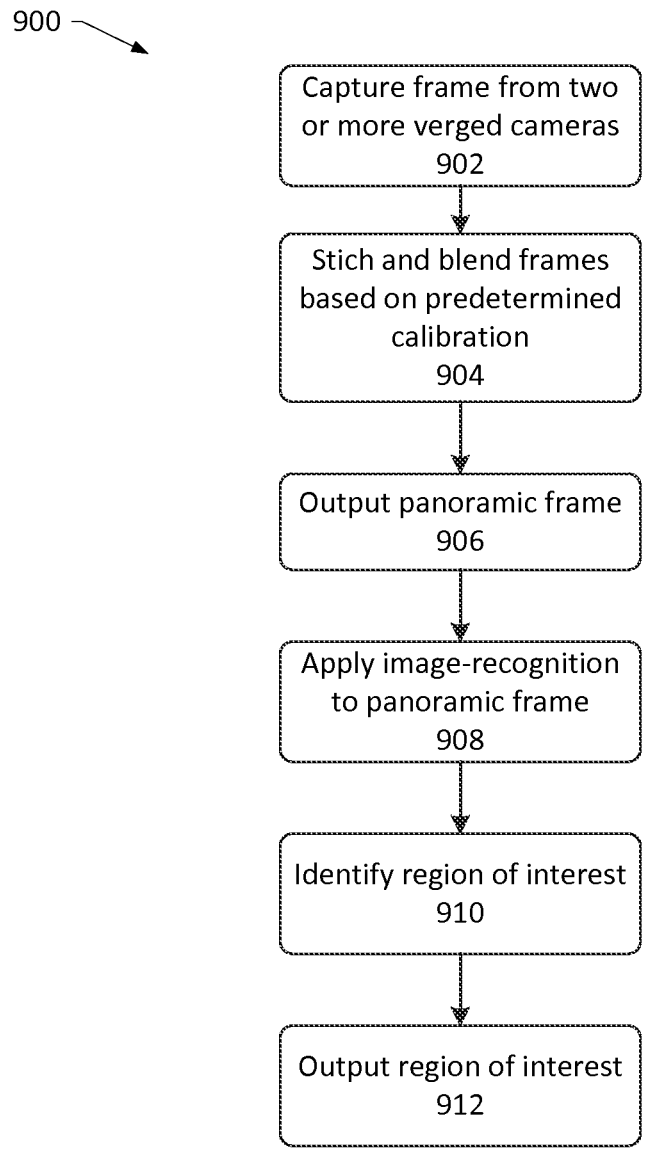
FIG. 9 is a block diagram of a process for capturing images with a camera device having verged cameras in accordance with an embodiment of the disclosure.

FIG. 9 depicts a process 900 for capturing images from a camera device having verged cameras in accordance with an embodiment of the disclosure. Initially, frames may be captured from two or more verged cameras (block 902). The captured frames may be stitched and blended using a predetermined calibration between the two or more verged cameras (block 904). Next, a panoramic frame may be output (block 906). In some embodiments, as mentioned above, a stereo image may be output using only two cameras of a camera device.

In some embodiments, image-recognition may be performed on the panoramic frame (block 908). For example, as discussed above, facial recognition may be performed on the panoramic frame to recognize a face of a person. In other embodiments, other types of recognition, such as shape recognition, may be performed on captured images. A region of interest in the panoramic frame may be identified (block 910) using the image-recognition. In some embodiments, the identified region of interest or an indication of the identified region of interest may be output (block 912). For example, a name or category of the identified region may be sent, via a wireless interface, to a computing device coupled to the camera device.

Figure 10:
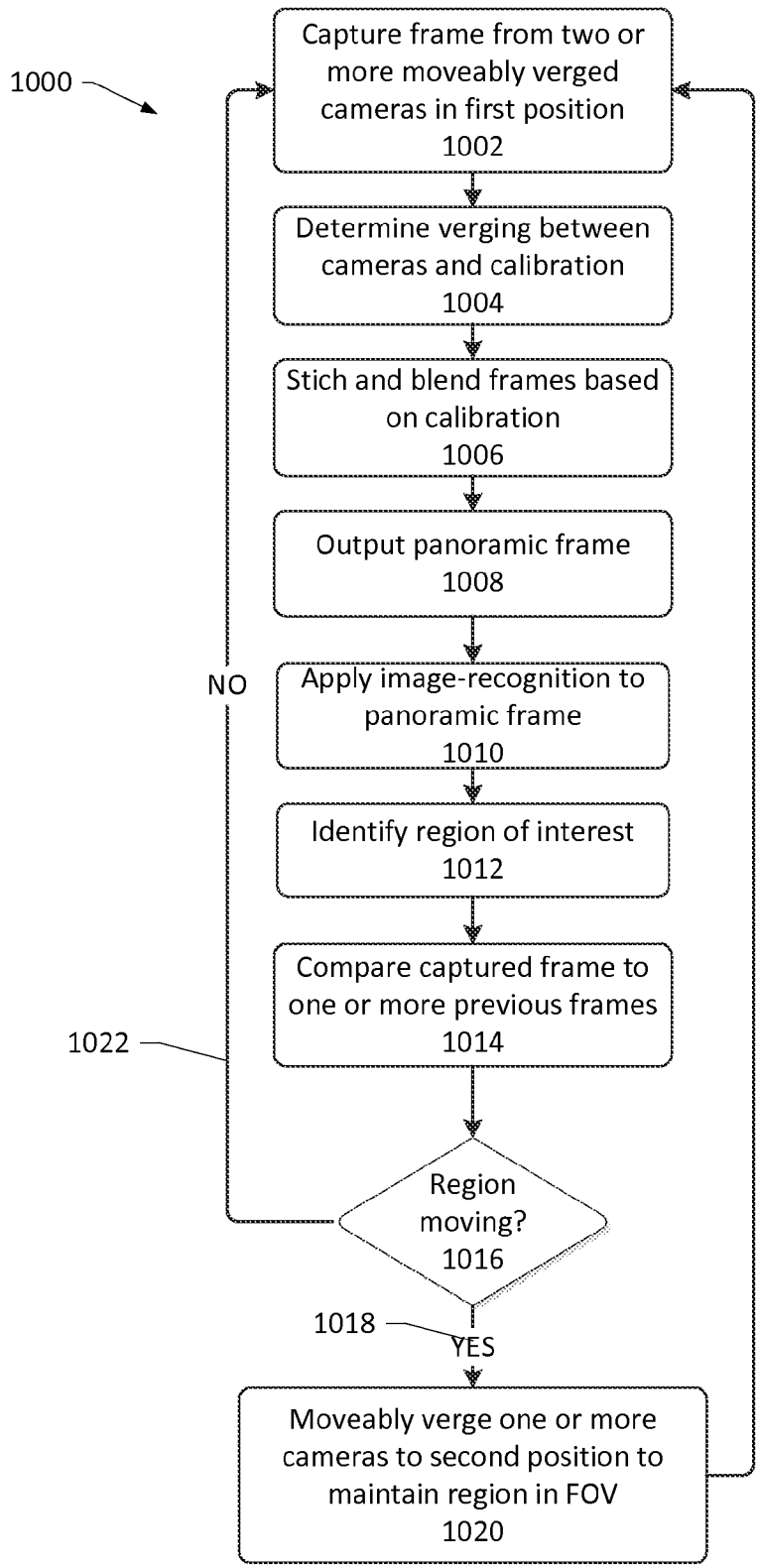
FIG. 10 is a block diagram of a process for capturing images with a camera device having movable verged cameras in accordance with an embodiment of the disclosure.

FIG. 10 depicts a process 1000 for capturing images from a camera device having moveably verged cameras in accordance with an embodiment of the disclosure. Initially, frames may be captured from two or more moveably verged cameras in a first position (block 1002). In some embodiments, the verging between the cameras may be determined (e.g., the difference between the verging angles of each camera), and the calibration between the cameras may then be determined (block 1004) The captured frames may be stitched and blended using an calibration between the two or more moveably verged cameras (block 1006). Next, a panoramic frame may be output (block 1008).

In some embodiments, image-recognition may be performed on the panoramic frame (block 1010). For example, as discussed above, facial recognition may be performed on the panoramic frame, such as to recognize a face of a person. A region of interest (e.g., a face) in the panoramic frame may be identified (block 1012) using the image-recognition. In some embodiments, the captured frame may be compared to one or more previously captured frames (block 1014) to determine whether the region is moving (decision block 1016). In some embodiments, a distance associated with the region of interest (e.g., a distance between the region and a camera) may be determined in a previously captured frame and compared to a distance associated with the region of interest (e.g., a distance between the region and a camera) in the captured frame. The difference between the distances may be used to determine whether the region of interest is moving toward or away from the camera device, e.g., by comparing the distance difference to a threshold, determining if the distances have increased, determining if the distances have decreased, etc.

If the region is moving (line 1018), one or more of the moveably verged cameras may be verged to a second position to maintain the region in the vertical FOV or in a designated area (e.g., the center) of the vertical FOV of each of the one or more cameras (block 1020). For example, if the recognized region is the face of a person, a camera device may determine whether the person's face is moving towards or away from the device (i.e., as the person walks toward or away from the camera device). Additional frames may then be captured from two or more of the verged cameras (block 1002). As the one or more of the cameras have been moveably verged to a new angle, the verging between the cameras may be determined and another calibration may then be determined (block 1004). The captured frames may be stitched and blended together (block 1006) and another panoramic frame may be output (block 1008).

If the region has not moved (line 1022), the cameras may remain in the first position and additional frames may be captured from the two or more moveably verged cameras. The region may be further evaluated to determine whether the region moves and to subsequently moveably verge the cameras based on such movement.

Figure 11:
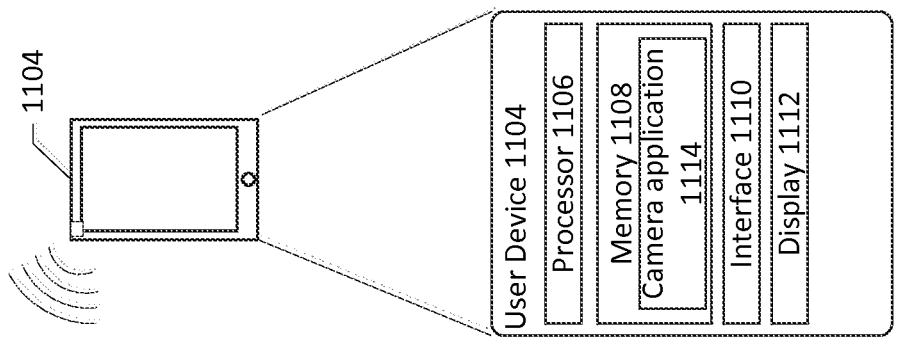
FIG. 11 is a schematic diagram of a camera device and a user device in accordance with an embodiment of the disclosure.
Figure 11:
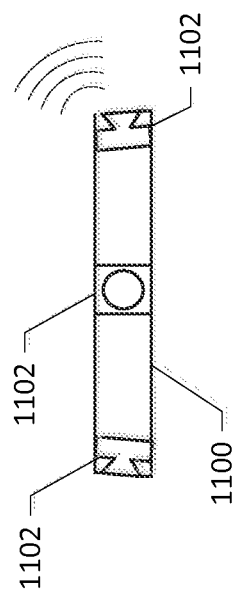

In some embodiments, a camera device may communicate with a user device (e.g., a smartphone, tablet, etc.). FIG. 11 depicts a block diagram of a camera device 1100 having verged cameras 1102 (e.g., verged cameras or moveably verged cameras) descried above in communication with a user device 1104. The user device 1104 may be, for example, a tablet computer, a smartphone, a wearable computer, a personal digital assistant (PDA), an e-reader, a laptop computer, a desktop computer, and the like. As shown in FIG. 11, the user device 1104 may include a processor 1106, memory 1108 (e.g., one or more memories such as volatile memory and non-volatile memory), an interface 1110, and a display 1112. It should be noted that FIG. 11 depicts merely one example of a particular implementation of a user device 1104 and may illustrate only some of the types of components and functionalities that may be present.

The processor 1106 may include one or more processors having characteristics similar to the processors 504 and 704 described above and. may be configured to access and execute (at least in part) computer-readable instructions stored in the memory 702. The processor 1106 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 1104 may also include a chipset (not shown) for controlling communications between the processor 1106 and one or more of the other components of the camera 1104. The memory 1108 may be similar to the memories 502 and 702 described above and may include volatile memory, such as random access memory (RAM), and non-volatile memory, such as ROM, flash memory, a hard drive, any other suitable optical, magnetic, or solid-state storage medium, or a combination thereof. The memory 1108 may store a variety of information and may be used for a variety of purposes and may store executable computer code. The executable computer code may include program instructions executable by a processor (e.g., the processor 702) to implement one or more embodiments of described herein. In some embodiments, the executable computer code may define a camera application 1114 stored by the memory 1108 and executed by the processor 1106. The camera application 114 may monitor and, in some embodiments, control the camera device 1100. For example, in some embodiments the camera application 1114 may, via the user device 1104, control the camera device 1102 by sending instructions to moveably verge the cameras 1102 from a first angle to a second angle. In some embodiments, the camera application 1114 may, via the user device 1104, send instructions to the camera device 1100 to begin recording images (e.g., still images or video), stop recording images, save images, delete images, and so on.

The memory 1108 may store an operating system that includes a plurality of computer-executable instructions that may be implemented by the processor 1106 to perform a variety of tasks to operate the user device 1104. In some embodiments, the memory 1108 may store still images and video received from the camera device 1100, such as over a wireless network.

The interface 1110 my function similarly to the interfaces 510 and 710 described above. For example, the interface 1110 may include one or more interfaces and may include one or more communication interfaces or network interface devices to provide for the transfer of data between the user device 1104 and the camera device 1100 and other devices, such as over one or more networks. The communication interfaces may provide access to, for example, personal area networks ("PANs"), wired local area networks ("LANs"), wireless local area networks ("WLANs"), wireless wide area networks ("WWANs"), and so forth. The communication interfaces may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP) or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), Short Message Service (SMS), or any other suitable communication protocols.

The display 1112 may display images in varying degrees of resolution, contrast, content, and/or location. The display 1112 may be, but is not limited to, a liquid crystal display (LCD), light emitting diode (LED) display, a lenticular display, an e-ink display, or an organic light emitting diode (OLED) display. The display 1112 may display a user interface (e.g., a graphical user interface). In accordance with some embodiments, the display 1112 may include or be provided in conjunction with touch sensitive elements through which a user may interact with the user interface. Such a touch-sensitive display may be referred to as a "touch screen."

In some embodiments, still images and video captured by the camera device 1100 may be transferred to the user device 1104 via a wired or wireless network (not shown). In some embodiments, the user device 1104 may display in real-time still images or video captured by the camera device 1104. In some embodiments, the user device 1104 may be used to configure the camera device via a wired or wireless network, such as by modifying settings of the camera device 1100, flashing firmware of the camera device 1100, updating software of the camera device 1100, calibrating the camera device 1100, and so on. In some embodiments, some processes described may be performed by the user device 1104 using image data received from the camera device 1100. For example, in some embodiments, the user device 1100 may perform stitching of images captured by the camera device 1100. In some embodiments, the user device 1100 may perform image-recognition or other similar processing on the images captured by the camera device 1100. In yet other embodiments, image data from the camera device 1100 may be sent to a server for such processing (e.g., directly to the server or via the user device 1104).

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatus, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
   a camera housing defining a horizontal plane extending through a housing;
   a first camera in the housing and having a first longitudinal camera axis extending through a center of the first camera, wherein the first camera is verged at a first angle defined by the first longitudinal camera axis and the horizontal plane;
   a second camera in the housing and having a second longitudinal camera axis extending through a center of the second camera, wherein the second camera is verged at a second angle defined by the second longitudinal camera axis and the horizontal plane;
   a third camera in the housing and having a third longitudinal camera axis extending through a center of the third camera, wherein the third camera is verged at a third angle defined by the third longitudinal camera axis and the horizontal plane;
   a fourth camera in the housing and having a fourth longitudinal camera axis extending through the center of the fourth camera, wherein the fourth camera is verged at a fourth angle defined by the fourth longitudinal camera axis and the horizontal plane, wherein the first angle, the second angle, the third angle, and the fourth angle are equal and non-zero;
   a connector configured to receive a charging dock, wherein connection of the charging dock orients the device in a first orientation;
   a mounting receptacle configured to receive a mounting apparatus, wherein receipt of the mounting apparatus orients the device in a second orientation opposite the first orientation;
   a processor; and
   a non-transitory computer-readable memory storing computer-executable instructions that, when executed by the processor, configure the processor to perform operations comprising:
     capture a first frame from the first camera;
     capture a second frame from the second camera;
     determine an overlap area between a first field of view of the first camera and a second field of view of the second camera; and
     determine, using at least the first frame, the second frame, and the overlap area, a panoramic frame.

2. The device of claim 1, comprising:
   one or more motors coupled to the first camera, the second camera, the third camera, and the fourth camera, wherein the motors are configured to move the cameras to a fifth angle defined by each respective longitudinal camera axis and the horizontal plane and different than the first angle, second angle, third angle, and fourth angle.

3. The device of claim 1, wherein the processor is further configured to perform operations comprising:
   identify a face of a person in a third frame captured by the first camera, the face associated with a first distance from the first camera;
   capture a fourth frame using the first camera, the fourth frame including the face of the person, the face associated with a second distance from the first camera;
   compare the fourth frame to the third frame;
   determine a difference between the first distance and the second distance;
   determine, based on the difference, that the face is moving toward or away from the device; and
   move, using a motor, the first camera to a fifth angle to maintain the face of the person in a designated area of a vertical field-of-view of the first camera.

4. A device, comprising:
   a housing defining a horizontal plane extending through a center of the housing;

a first camera disposed in the housing and having a first longitudinal axis extending through a center of the first camera, wherein the first camera is verged at a first angle defined by the first longitudinal axis and the horizontal plane;

a second camera in the housing and having a second longitudinal axis extending through a center of the second camera, wherein the second camera is verged at a second angle defined by the second longitudinal axis and the horizontal plane;

a third camera in the housing and having a third longitudinal axis extending through a center of the third camera, wherein the third camera is verged at a third angle defined by the third longitudinal axis and the horizontal plane;

a processor; and a non-transitory computer-readable memory storing computer-executable instructions that, when executed by the processor, configure the processor to perform operations comprising:

capture a first frame from the first camera;
capture a second frame from the second camera;
determine an overlap area between a first field of view of the first camera and a second field of view of the second camera; and
determine, using at least the first frame, the second frame, and the overlap area, a panoramic frame.

5. The device of claim 4, comprising a fourth camera in the housing and having a fourth longitudinal axis extending through a center of the fourth camera, wherein the fourth camera is verged at a fourth angle defined by the fourth longitudinal axis and the horizontal plane.

6. The device of claim 5, wherein the first angle, second angle, third angle, and fourth angle are equal and non-zero.

7. The device of claim 4, wherein the housing comprises:
a first surface approximately parallel to the horizontal plane;
a second surface opposite the first surface;
a connector proximate the first surface and configured to receive a battery charger, wherein receipt of the battery charger orients the housing in a first orientation.

8. The device of claim 7, comprising:
a receptacle proximate the second surface and configured to receive a mounting apparatus, wherein receipt of the mounting apparatus orients the housing in a second orientation, wherein the first orientation is an inverse of the second orientation.

9. A device, comprising:
a housing defining a horizontal plane extending through a center of the housing;
a first camera disposed in the housing and having a first longitudinal axis extending through a center of the first camera, wherein the first camera is moveable from a first horizontal position to a first angle defined by the first longitudinal axis and the horizontal plane;
a second camera in the housing and having a second longitudinal axis extending through a center of the second camera, wherein the second camera is moveable from a second horizontal position to a second angle defined by the second longitudinal axis and the horizontal plane;
a third camera in the housing and having a third longitudinal axis extending through a center of the third camera, wherein the third camera is moveable from a third horizontal position to a third angle defined by the third longitudinal axis and the horizontal plane;
a processor; and a non-transitory computer-readable memory storing computer-executable instructions that, when executed by the processor, configure the processor to perform operations comprising:
capture, at a first time, a first frame from the first camera, a second frame from the second camera, and a third frame from the third camera;
determine an overlap area between at least a first field of view of the first camera and a second field of view of the second camera; and
determine, using the overlap area, the first frame, the second frame, and the third frame, a panoramic frame.

10. The device of claim 9, comprising:
a microelectromechanical system coupled to the first camera, the second camera, and the third camera, wherein the microelectromechanical system is configured to moveably verge the first camera to the first angle, movably verge the second camera to the second angle and movably verge the third camera to the third angle.

11. The device of claim 9, wherein the first angle, second angle, and third angle are equal.

12. The device of claim 9, wherein the housing comprises:
a first surface approximately parallel to the horizontal plane;
a second surface opposite the first surface; and
a connector proximate the first surface and configured to receive a battery charger, wherein receipt of the battery charger orients the housing in a first orientation.

13. The device of claim 12, comprising:
a receptacle proximate the second surface and configured to receive a mounting apparatus, wherein receipt of the mounting apparatus orients the housing in a second orientation, wherein the first orientation is an inverse of the second orientation.

14. The device of claim 9, comprising a fourth camera in the housing and having a fourth longitudinal axis extending through a center of the fourth camera, wherein the fourth camera is moveable from a fourth horizontal position to a fourth angle defined by the fourth longitudinal axis and the horizontal plane, wherein the first camera is disposed in the housing opposite the fourth camera.

15. The device of claim 9, the non-transitory computer-readable memory storing computer-executable instructions that, when executed by the processor, configure the processor to perform operations further comprising:
identify an object in the panoramic frame, first frame, second frame, or third frame;
capture a fourth frame from the first camera, second camera, or third camera;
compare the fourth frame to the first frame, second frame, or third frame;
determine that the object is moving toward or away from the device; and
move at least one of the first camera, the second camera, and the third camera to a fourth angle that maintains the object in a designated portion of a vertical field of view of at least one of the first camera, second camera, or third camera.

16. The device of claim 15, wherein compare the fourth frame to the first frame, second frame, or third frame comprises:
identify, in the panoramic frame, first frame, second frame, or third frame, a first distance associated with a region;

identify, in the fourth frame, a second distance associated with the region; and determine a difference between the first distance and the second distance.

17. The device of claim 15, wherein the calibration is a first calibration, the non-transitory computer-readable memory storing computer-executable instructions that, when executed by the processor, configure the processor to perform operations further comprising:

determine, after moving at least one of the first camera, the second camera, and the third camera to the third angle, a second calibration between at least two of the first camera, the second camera, and the third camera.

\* \* \* \* \*